(12) United States Patent
Tomita et al.

(10) Patent No.: US 7,925,425 B2
(45) Date of Patent: Apr. 12, 2011

(54) NAVIGATION INFORMATION DISTRIBUTION SYSTEMS, METHODS, AND PROGRAMS

(75) Inventors: Hiroshi Tomita, Anjo (JP); Kenji Nagase, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1051 days.

(21) Appl. No.: 11/727,339

(22) Filed: Mar. 26, 2007

(65) Prior Publication Data

US 2007/0229309 A1 Oct. 4, 2007

(30) Foreign Application Priority Data

Mar. 31, 2006 (JP) ................................. 2006-098038

(51) Int. Cl.
*G08G 1/00* (2006.01)
(52) U.S. Cl. ........ 701/118; 701/117; 701/119; 701/210; 340/995.13; 340/995.17; 340/995.19
(58) Field of Classification Search .......... 701/117–210; 340/995.13, 995.14, 995.17, 995.19
See application file for complete search history.

(56) References Cited

U.S. PATENT DOCUMENTS

| | | | | |
|---|---|---|---|---|
| 5,182,555 A | * | 1/1993 | Sumner | 340/905 |
| 5,257,023 A | * | 10/1993 | Furuya | 340/995.13 |
| 5,420,794 A | * | 5/1995 | James | 701/117 |
| 5,646,853 A | * | 7/1997 | Takahashi et al. | 455/456.5 |
| 6,246,932 B1 | * | 6/2001 | Kageyama et al. | 701/24 |
| 6,282,486 B1 | * | 8/2001 | Bates et al. | 701/117 |
| 6,314,360 B1 | * | 11/2001 | Becker | 701/117 |
| 6,385,531 B2 | * | 5/2002 | Bates et al. | 701/117 |

(Continued)

FOREIGN PATENT DOCUMENTS

CN 097141348 * 10/2010

(Continued)

OTHER PUBLICATIONS

ECODA: Enhanced congestion detection and avoidance for multiple class of traffic in sensor networks; Liqiang Tao; Fengqi Yu; Communications, 2009. APCC 2009. 15th Asia-Pacific Conference on; Digital Object Identifier: 10.1109/APCC.2009.5375498 Publication Year: 2009 , pp. 726-730; cited by other.*

(Continued)

*Primary Examiner* — Cuong H Nguyen
(74) *Attorney, Agent, or Firm* — Oliff & Berridge, PLC

(57) ABSTRACT

Navigation information distribution systems, methods, and programs transfer a piece of vehicle position information to an information distribution center every predetermined time period, the piece of vehicle information including a vehicle position and a time when the vehicle passes through the vehicle position. The systems, methods, and programs receive pieces of vehicle position information and traffic information including congestion information, store the received pieces of vehicle position information in order of arrival, and specify a congested road section on the basis of congestion information. The systems, methods, and programs assign a weight of a first travel distance within the congested road section, the weight of the first travel distance calculated on the basis of two of the received pieces of vehicle position information received from the navigation apparatus and congestion information about the congested section. The systems, methods, and programs calculate a first travel time corresponding to the first travel distance, calculate the congested section travel time necessary for passing through the congested section based on the calculated first travel time, and distribute the calculated congested section travel time to a navigation apparatus.

17 Claims, 7 Drawing Sheets

U.S. PATENT DOCUMENTS

| | | | |
|---|---|---|---|
| 6,401,027 B1 | 6/2002 | Xu et al. | |
| 6,433,704 B1 | 8/2002 | Fushiki et al. | |
| 6,542,815 B1 | 4/2003 | Ishizaki et al. | |
| 7,089,107 B2* | 8/2006 | Jones | 701/201 |
| 7,113,110 B2* | 9/2006 | Horstemeyer | 340/994 |
| 7,418,338 B2* | 8/2008 | Ohnishi et al. | 701/117 |
| 7,538,691 B2* | 5/2009 | Horstemeyer | 340/994 |
| 7,580,788 B2* | 8/2009 | Hiruta et al. | 701/117 |
| 2005/0093720 A1* | 5/2005 | Yamane et al. | 340/995.13 |
| 2006/0161334 A1* | 7/2006 | Teramae | 701/117 |
| 2008/0077316 A1* | 3/2008 | Yamane et al. | 701/119 |
| 2009/0177373 A1* | 7/2009 | Groenhuijzen et al. | 701/117 |
| 2009/0287408 A1* | 11/2009 | Gerdes et al. | 701/202 |
| 2010/0174474 A1* | 7/2010 | Nagase | 701/118 |
| 2010/0185382 A1* | 7/2010 | Barker et al. | 701/119 |
| 2010/0185384 A1* | 7/2010 | Naito et al. | 701/200 |
| 2010/0188265 A1* | 7/2010 | Hill et al. | 340/905 |
| 2010/0222999 A1* | 9/2010 | DeVries et al. | 701/200 |
| 2010/0254282 A1* | 10/2010 | Chan et al. | 370/253 |
| 2010/0292916 A1* | 11/2010 | Kurciska et al. | 701/201 |

FOREIGN PATENT DOCUMENTS

| | | | |
|---|---|---|---|
| JP | A-2003-16570 | | 1/2003 |
| JP | A-2003-178396 | | 6/2003 |
| JP | A 2004-020288 | | 1/2004 |
| JP | A-2005-265708 | | 9/2005 |
| JP | PCT/JP2008/062937 | * | 1/2010 |
| JP | PCT/JP2009/053799 | * | 3/2010 |
| JP | PCT/JP2007/060494 | * | 11/2010 |

OTHER PUBLICATIONS

V2X-Based Traffic Congestion Recognition and Avoidance; Wedel, J.W.; Schunemann, B.; Radusch, I.; Pervasive Systems, Algorithms, and Networks (ISPAN), 2009 10th International Symposium on; Digital Object Identifier: 10.1109/I-SPAN.2009.71 Publication Year: 2009 , pp. 637-641; cited by other.*

T. Queck, B. Schunemann, I. Radusch, and C. Meinel, "Realistic simulation of v2x communication scenarios," in APSCC '08: Proceedings of the 2008 IEEE Asia-Pacific Services Computing Conference; Washington, DC, USA: IEEE Computer Society, 2008, pp. 1623-1627; cited by other.*

A. Wegener, M. Piorkowski, M. Raya, H. Hellbruck, S. Fischer, and J.-P. Hubaux, "TraCI: An Interface for Coupling Road Traffic and Network Simulators," in 11th Communications and Networking Simulation; Symposium (CNS'08), 2008; cited by other.*

Benefits of dynamic route guidance systems as part of a future oriented city traffic management system; Sparmann, J.M.; Vehicle Navigation and Information Systems Conference, 1991; vol. 2; Digital Object Identifier: 10.1109/VNIS.1991.205829 Publication Year: 1991 , pp. 839-847.*

A dynamic navigation scheme for vehicular ad hoc networks; Yan-Jing Wu; Wei-Cheng Sung; Networked Computing and Advanced Information Management (NCM), 2010 Sixth International Conference on; Publication Year: 2010 , pp. 231-235.*

Travel times as a basic part of the LISB guidance strategy; Hoffmann, G.; Janko, J.; Road Traffic Control, 1990., Third International Conference on; Publication Year: 1990 , pp. 6-10.*

Comparison of Travel Time Estimation Using Analysis and Queuing Theory to Field Data Along Freeways; Jiyoun Yeon; Byungkon Ko; Multimedia and Ubiquitous Engineering, 2007. MUE '07. International Conference on; Digital Object Identifier: 10.1109/MUE.2007. 105; Publication Year: 2007 , pp. 530-538.*

An Automobile Control Method for Alleviation of Traffic Congestions Using Inter-Vehicle Ad Hoc Communication in Lattice-Like Roads; Inoue, S.; Shozaki, K.; Kakuda, Y.; Globecom Workshops, 2007 IEEE; Digital Object Identifier: 10.1109/GLOCOMW.2007. 4437828; Publication Year: 2007 , pp. 1-6.*

A global routing strategy in dynamic traffic environments with a combination of Q value-based dynamic programming and boltzmann distribution; Shanqing Yu et al.; SICE Annual Conference, 2008; Digital Object Identifier: 10.1109/SICE.2008.4654732; Publication Year: 2008 , pp. 623-627.*

Practical travel time prediction algorithms based on neural network and data fusion for urban expressway; Dewang Chen et al.; Natural Computation (ICNC), 2010 Sixth International Conference on; vol. 4; Digital Object Identifier: 10.1109/ICNC.2010.5584403; Publication Year: 2010 , pp. 1754-1758.*

Determining time to traverse road sections based on mapping discrete GPS vehicle data to continuous flows; Miller, J. et al.; Intelligent Vehicles Symposium (IV), 2010 IEEE; Digital Object Identifier: 10.1109/IVS.2010.5548009; Publication Year: 2010 , pp. 615-620.*

Reliability of real-time information systems for route choice decisions in a congested traffic network: Some simulation experiments; Chen, P.S.; Mahmassani, H.S.; Vehicle Navigation and Information Systems Conference, 1991; vol. 2 Digital Object Identifier: 10.1109/VNIS.1991.205830; Publication Year: 1991 , pp. 849-856.*

European Search Report issued in Application No. 07 00 5806 on Sep. 7, 2009.

* cited by examiner

NAVIGATION INFORMATION DISTRIBUTION SYSTEMS, METHODS, AND PROGRAMS

INCORPORATION BY REFERENCE

The disclosure of Japanese Patent Application No. 2006-098038, filed on Mar. 31, 2006, including the specification, drawings and abstract thereof, is incorporated herein by reference in its entirety.

BACKGROUND

1. Related Technical Fields

Related technical fields include navigation systems, particularly for distributing traffic congestion information from an information distribution center to a navigation apparatus.

2. Description of the Related Art

In resent years, a navigation apparatus for enabling a driver to easily navigate a vehicle to a desired destination has become very popular. The navigation apparatus detects a current position of the vehicle, for example, by GPS, obtains map data corresponding to the current position through a data storage medium, such as a DVD-ROM or an HDD, or a network, and displays the map on an LCD monitor. The navigation apparatus reads out map data including a current position of the vehicle from the data storage medium and displays the map surrounding the current vehicle position on a display device on the basis of the map data. The navigation apparatus indicates the position of the vehicle on the map using a position indicator. The map may be scrolled according to the traveling direction of the vehicle or the vehicle position indicator may be relocated over the fixed map, so that the driver may check where the vehicle is currently traveling at a glance.

Such navigation system may also distribute traffic congestion information from an information distribution center to a navigation apparatus. For example, Japanese Unexamined Patent Application Publication No. 2004-20288 (paragraph [0011] to paragraph [0039], FIGS. 1 to 6) discloses a navigation apparatus that calculates a time required to pass through a road section when traveling along the road section and reports the required travel time to an information distribution center. The navigation apparatus requests a latest required travel time for a road section, on which the vehicle will be traveling, from the information distribution center, and predicts an arrival time to a destination on the basis of the information received from the information distribution center. The information distribution center receives required section travel time information reported from the vehicle and stores required travel times for road sections on a road. The information distribution center gathers statistics about required section travel time information from vehicles and updates statistical information in the required section travel time database. The information distribution center estimates a required section travel time corresponding to the road section requested by the vehicle and then transfers the estimated required section travel time information to the vehicle.

Thus, in the navigation system of Japanese Unexamined Patent Application Publication No. 2004-20288, the information distribution center stores the latest required travel times of road sections reported from vehicles in a database. When the driver of one of the vehicles wants to know an arrival time to a destination, the navigation system in the vehicle requests and obtains the latest travel time of a road section on which the vehicle is currently traveling to the information distribution center and predicts the arrival time to the destination on the basis of the latest travel time for the road section. As a result, the navigation system may predict the arrival time to the destination according to the traffic congestion situation at a given time even if a traffic analysis apparatus is not set on the road section.

SUMMARY

However, in the navigation system described above, the navigation apparatus calculates a required time to travel a road section every time the navigation apparatus passes through the road section and reports the required time to the information distribution center. For example, when it takes a long time for a vehicle with the navigation system to travel through a congested section (for example, anywhere between about 30 minutes to 3 hours), the information distribution center has to wait a long time until it receives the required time to travel the congested section (a congested section travel time) from the vehicle. As a result, the information distribution center cannot distribute the congested section travel time to another navigation apparatus of a vehicle, which has requested that information.

Accordingly, various exemplary implementations of the broad inventive principles described herein provide a navigation system including a navigation apparatus for transferring vehicle position to an information distribution center at predetermined time intervals and an information distribution center for calculating a required time to travel the congested section (a congested section travel time) before the navigation apparatus passes through the congested section.

Various exemplary implementations provide navigation information distribution systems, methods, and programs that may transfer a piece of vehicle position information to an information distribution center every predetermined time period, the piece of vehicle information including a vehicle position and a time when the vehicle passes through the vehicle position. The systems, methods, and programs may receive pieces of vehicle position information and traffic information including congestion information, may store the received pieces of vehicle position information in order of arrival, and may specify a congested road section on the basis of congestion information. The systems, methods, and programs may assign a weight of a first travel distance within the congested road section, the weight of the first travel distance calculated on the basis of two of the received pieces of vehicle position information received from the navigation apparatus and congestion information about the congested section. The systems, methods, and programs may calculate a first travel time corresponding to the first travel distance, may calculate the congested section travel time necessary for passing through the congested section based on the calculated first travel time, and may distribute the calculated congested section travel time to a navigation apparatus.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
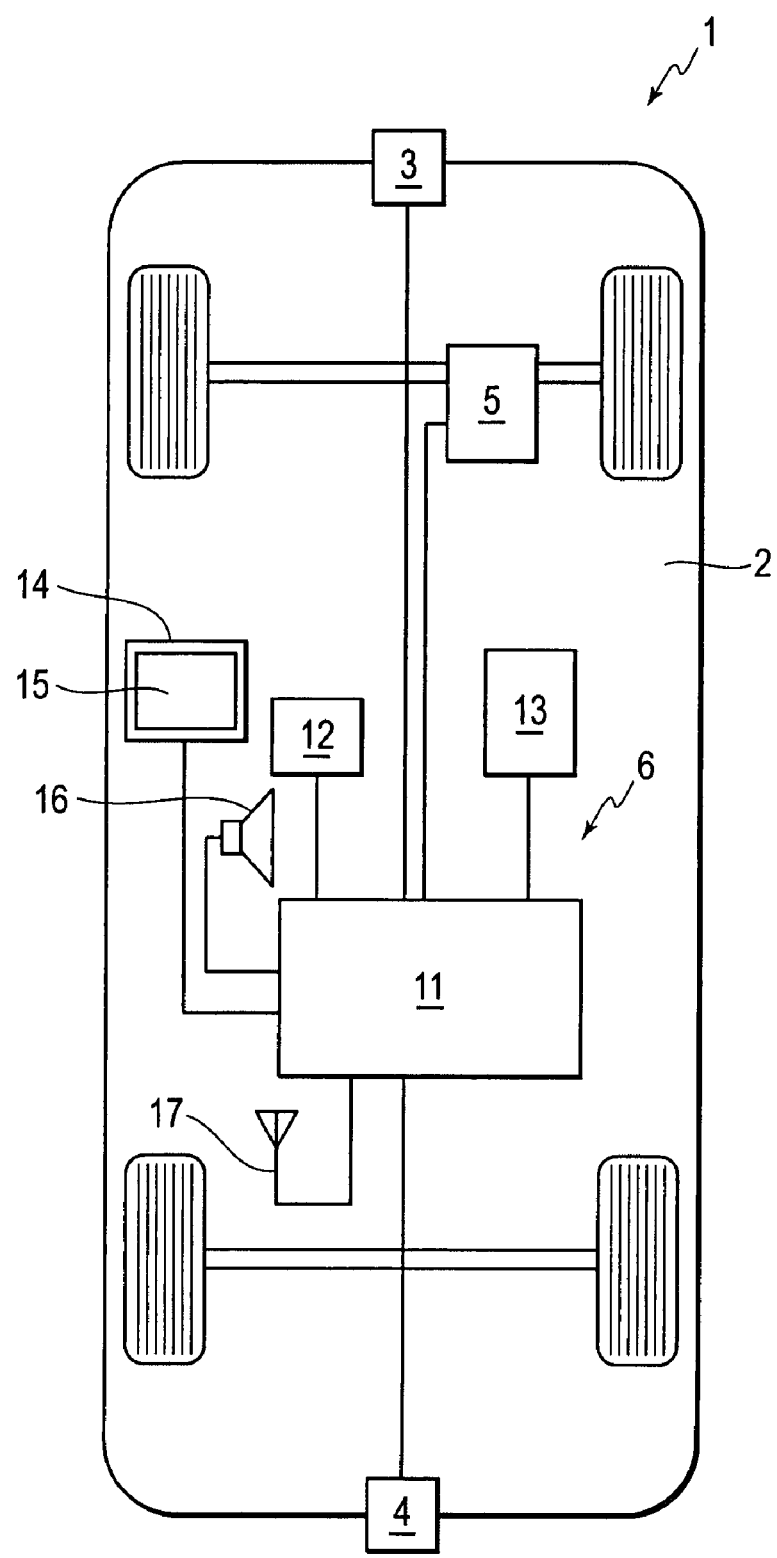
FIG. 1 is a block diagram showing an exemplary navigation system.

FIG. 1 is a block diagram showing an exemplary navigation system 1. As shown in FIG. 1, the navigation system 1 may functionally, physically, and/or conceptually include a navigation apparatus 2, an information distribution center 3, and a network 4. The information distribution center may distribute update information, which the navigation apparatus 2 needs to update map information, and/or a congested section travel time for passing through a congested section (described later). The navigation apparatus 2 and the information distribution center 3 may transfer various types of information through the network 4.

A road traffic information center 5 (e.g., VICS®: Vehicle Information and Communication System) may be connected to the network 4, and the navigation apparatus 2 and the information distribution center 3 may receive traffic information such as road congestion information and/or traffic control information, from the road traffic information center 5. Both types of information may be created by collecting information from a traffic control system shared by the Police Department and the Japan Highway Public Corporation, at predetermined time intervals through the network 4. For example, detailed traffic information such as road congestion information according to road congestion and/or traffic control information according to road construction and/or building construction may be included. As road congestion information, a VICS® link ID, length of an actual congested section, congestion degree (e.g., "not congested," "crowded," or "congested"), vehicle speed in a congested section, travel direction of traffic in a congested traffic lane, and/or predicted time for reduction of congestion may be included. As traffic control information, a traffic type or traffic control period information, such as the VICS® link ID, a construction period of road construction/building construction, a closed-section-to-traffic road, an alternate one-way traffic control, and/or a lane closure may be included.

As shown in FIG. 1, the information distribution center 3 may include includes a controller (e.g., server 10), a center map information database (DB) 14 connected to the server 10, a navigation update history information DB 15, a center traffic information DB 16, a center communication device 17, and/or a section travel time DB 20 for storing a travel time necessary for passing through a road section (a road link). The server 10 may include a CPU 11, and an internal storage device, such as a RAM 12, and/or an ROM 13.

The CPU 11 may be a calculating device and a control device for controlling the entire server 10. However, an MPU may be used instead of the CPU 11. The RAM 12 may be used as a working memory when the CPU 11 executes various calculations. In the ROM 13, various types of control programs such as for updating map information and distributing congested section travel times may be stored. Specifically, in order to update map information, the information distribution center 3 may update one or more sections of map information to new map information on the basis of a request from the navigation apparatus 2 and distributes the new map information to the navigation apparatus 2. In order to distribute a congested section travel time, the information distribution center 3 may update and store a congested section travel time necessary for passing through a congested section in a section travel time DB 20. The information distribution center 3 may read out the congested section travel time from the section travel time DB 20 on the basis of the request from the navigation apparatus 2 and distribute the congested section travel time to the navigation apparatus 2.

Update map information 18 may be sorted into versions and may be stored in the center map information DB 14. The update map information 18 may form the basis of map information distributed by in the information distribution center 3 and stored in a navigation apparatus 2. Further, update information for updating at least a portion of map information stored in the navigation apparatus may also stored in the center map information DB 14. The term "version," as used herein, refers to a creation date specifying when a particular portion of map information is created.

Various types of information, which are necessary for the navigation apparatus 2 to provide route guidance or display a map, may be stored in the update map information 18 stored in the center map information DB 14. For example, map display data for displaying a map, intersection data, node data for node points, link data for road links, facility data, search data for searching for a route, shop data for POI (point of interest) as a type of facility, and/or detection data for detecting points may be included in the update map information 18.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

According to the map display data, a "mesh" or grid, which divides the land into 10-square-kilometer areas is used as a standard unit. Further, the standard unit may be subdivided into 4 subunits (½ length), 16 subunits (¼ length), or 64 subunits (⅛ length) and those subunits may be used as each data amount of each area is evened out. The area of the smallest subunit, for example, the case when the standard unit is divided into 64 subunits, may be about 1.25-square-kilometers.

As node data, coordinates of a node point such as a fork in an actual road (including an intersection and a T-shaped intersection) or points which are set on a road at intervals of a predetermined distance depending on a curvature radius of the road, a node attribute to determine whether a node is on an intersection, a connected link number list for link IDs of links which are connected to nodes, an adjoining node number list for node numbers of adjoining nodes of a link, and/or a height of a node point (altitude) may be stored.

As link data, data according to road links forming roads, data according to a corner, data according to a road attribute, and/or data according to a road type may be stored. The data regarding road links may include data indicating a width of a road formed by links, a grade, a cant, a bank, a condition of a road surface, the number of traffic lanes, a point where the number of traffic lanes reduces, a point where a width of a road becomes narrow, and/or a crossing place. The data regarding a corner may include data indicating a curvature radius, an intersection, a T-shaped intersection, and/or a start/end point of a curve. The data regarding a road attribute may include data indicating a downward slope and an upward slope. The data regarding road type may include data indicating a national road, a prefectural road, a narrow street, a highway, an urban highway, a tollway, and/or a toll bridge. Further, according to such tollways, data regarding an entrance/exit of the tollways (a ramp way) and a tollbooth (an interchange) may be included.

Search data may be used for searching for a route to a set destination and displaying the route. For example, search data may include route display data for displaying a route selected by the route search described above on an LCD display 25 and cost data. Cost data may be used for classifying a weight of a node (hereinafter referred to as "cost") indicating the desirability for including the node in a route. Cost data for a node may be based on, for example, an existence or nonexistence of a right/left turn at the node, a link distance, a width of a road, and/or a road type.

As shop data, POI data such as that regarding a hotel, a hospital, a gas station, a parking area, and/or a sightseeing facility in various areas may be stored with POI IDs specifying POIs. Note that, audio output data to output certain information from the speaker 26 of the navigation apparatus 2 may be stored in the center map information DB 14.

The information distribution center 3 may update map information stored in the navigation apparatus 2 to the latest version of the update map information 18 among a plurality of update map information sources 18 stored in the center map information DB 14 when the navigation apparatus 2 requests update of information. Specifically, for example, when the navigation apparatus 2 requests a distribution of the update map information 18, the latest update map information 18 may be distributed to the navigation apparatus 2. Thereby the existing information may in the navigation apparatus may be updated to the latest update map information 18.

If newly created road information is included in the latest version of the update map information 18, the entire update map information 18 may be transferred to the navigation apparatus 2 as update information, or the minimum necessary information (only a necessary part of information including newly created road information to specify which road is the newly created) of the update map information 18 may be transferred to the navigation apparatus 2.

Update history information may be an update history to date according to map information stored in a particular navigation apparatus 2. The update history information may be stored in the navigation update history information DB 15 in correspondence with the navigation ID of the particular navigation apparatus 2. Versions of map information which should be used when information is updated may be preset according to each piece of detailed map information such as link data and/or node data as update history, so that every time map information in the navigation apparatus 2 is updated, the update history may be rewritten.

In the center traffic information DB 16, current traffic information 19A may be stored. The current traffic information 19A may be information regarding current traffic congestion and may be created by collecting traffic information received from the road traffic information center 5. Further, statistical traffic information 19B according to past traffic congestion may be stored in the center traffic information DB 16. The statistical traffic information 19B may include event information such as a date and place of, for example, a festival, a parade, or fireworks. For example, the statistical traffic information 19B may include information about the date and/or time when the event is to be held.

Similarly, statistical congestion information or predicted congestion information such as information that the amount of traffic increases on roads around a station or big commercial facilities during a specific weekday time period, and/or information that the amount of traffic increases on roads around a beach during the summer vacation, may be stored as the statistical traffic information 19B.

In the center traffic information DB 16, predicted traffic information 19C, which is created on the basis of the current traffic information 19A and the statistical traffic information 19B, may also be stored. The predicted traffic information 19C may be predicted congestion information at predetermined time intervals in the future on the basis of current congestion (for example, about every 30 minutes, 1 hour, or 2 hours from a current time). When the navigation apparatus 2 requests the distribution of traffic information, the information distribution center 3 may distribute selected traffic information according to each intersection on the basis of the current traffic information 19A, the statistical traffic information 19B, and the predicted traffic information 19C stored in the center traffic information DB 16 to the navigation apparatus 2.

Traffic information received from the road traffic information center 5 may include information according to type, position, distance of a congested section, and/or congestion degree as well as VICS® link ID. The "VICS® link ID" refers to an identification number which is provided to each VICS® link as a travel guidance link. The travel guidance link is standardized and is a road or portion of a road separated by predetermined intersections. Note that, the traffic information described above may include information regarding coordinates of a starting point/ending point of the VICS® link and a distance between the starting point and the ending point.

Note that a road link stored in the center map information DB 14 need not be the same as the VICS® link. That is the road links may be broken into smaller sections than the VICS® links. Therefore, the navigation apparatus 2 may have an ID conversion table for a road link ID, which is provided to each road link. Using the table the road link ID may be converted to a VICS® link ID, and vise versa. Thus, when the navigation apparatus 2 having the ID conversion table receives the VICS® link ID from the information distribution center 3 and/or the road traffic information center 5, the navigation apparatus may specify a road link whose traffic information such should be displayed on the basis of the VICS® link ID.

If the navigation apparatus 2 does not have the ID conversion table, the navigation apparatus 2 cannot specify a road link on the basis of the VICS® link ID. Therefore, for example, the conversion table may also be stored in the center traffic information DB 16 as well, so that the VICS® link ID may be converted to the road link ID used in the navigation apparatus 2 before it is sent to the navigation apparatus 2. As a result, traffic information may be transferred to the navigation apparatus 2 even if it does not have the ID conversion table.

The information distribution center 3 may be managed by any agency such as an individual, a business organization, a community, a local government unit, a government organization, and/or the road traffic information center 5.

As the network 4, for example, a local area network (LAN), a wide area network (WAN), an intranet, a mobile phone line network, a telephone line network, a public communication network, a private communication network, and/or the Internet may be used. Further, CS broadcasts, BS broadcasts, terrestrial digital broadcasting, FM multiple broadcasting using a broadcast satellite, an electronic toll collection system (ETC) used for an intelligent transportation system (ITS), and/or a dedicated short-range communication system (DSRC) may be used as the network 4.

Figure 2:
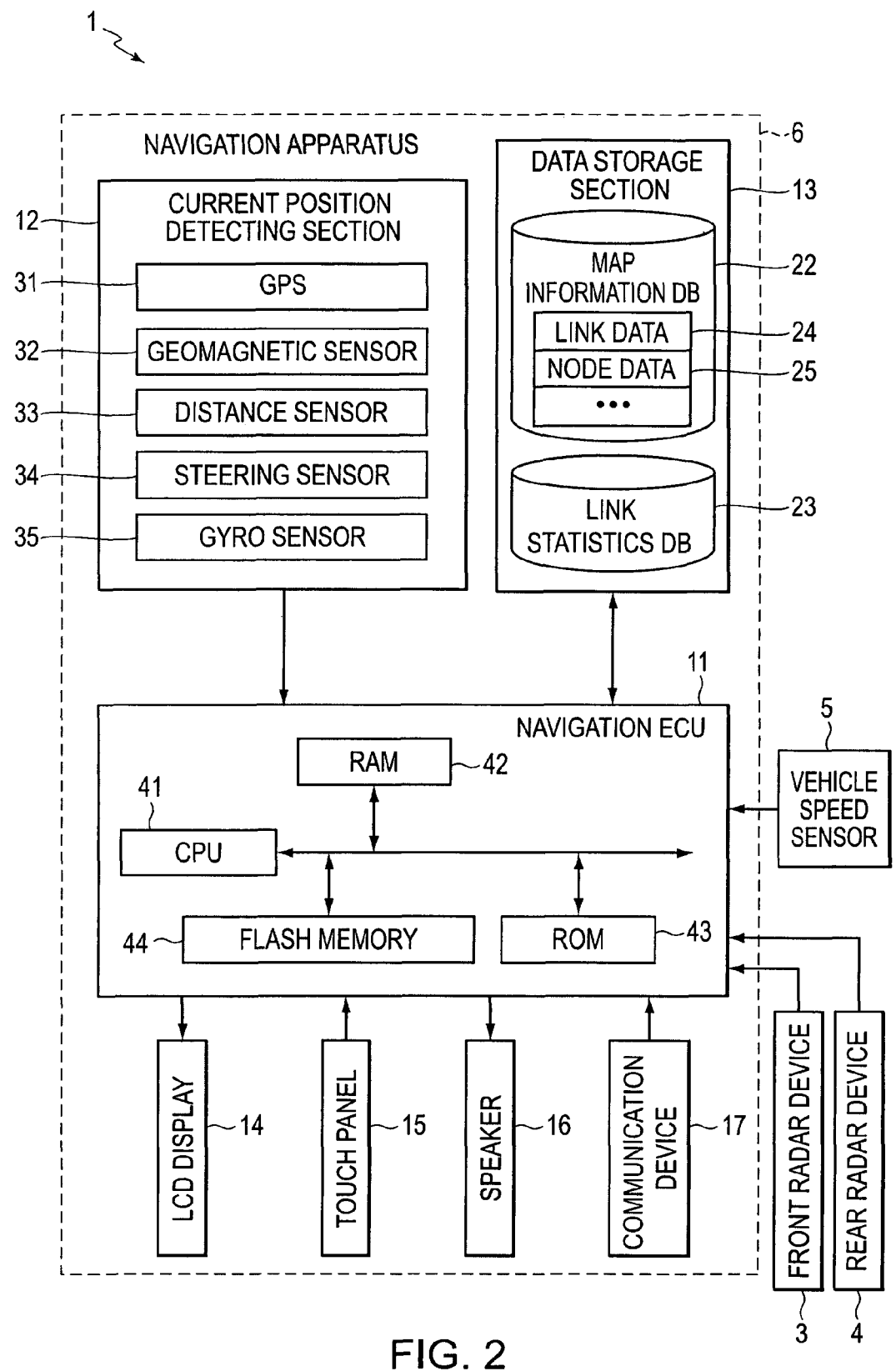
FIG. 2 is a block diagram showing an exemplary navigation apparatus.

Next, an exemplary structure of the navigation apparatus 2 that may be used in the navigation system 1 will be described with reference to FIG. 2. As shown in FIG. 2, the navigation apparatus 2 may physically, functionally, and/or conceptually include a current position detecting section 21 for detecting a current position of a vehicle, a data storage section 22 for storing various types of data, a controller (navigation control section 23) for executing various types of calculation on the basis of input information, an operation section 24 for processing an operation by an operator, an LCD display 25 for displaying information such as a map for the operator, a speaker 26 for outputting an audio guidance according to a route guidance, and/or a communication device 27 for communicating with the road traffic information center 5 and/or the information distribution center 3. Further, a vehicle speed sensor 28 for detecting a traveling speed of the vehicle may be connected to the navigation control section 23.

The current position detecting processing section 21 may include a GPS 31, a geomagnetic sensor 32, a distance sensor 33, a steering sensor 34, a gyro sensor 35 as a direction detecting section, and/or an altimeter (not shown) and may detect the position, the direction, and/or the distance (for example, a distance to an intersection) of the vehicle.

Specifically, the GPS 31 may detect a current vehicle position and a current time by receiving an electric wave provided by a satellite. The geomagnetic sensor 32 may detect a vehicle direction via the earth's magnetic field. The distance sensor 33 may detect a distance between predetermined points on a road. For example, as the distance sensor 33, a sensor for measuring a rotating speed of vehicle wheels (not shown) and detecting a distance on the basis of the rotating speed or another sensor for measuring an acceleration, integrating the acceleration twice, and detecting the distance may be used.

The steering sensor 34 may detect a steering angle of the vehicle. For example, an optical rotation sensor or a rotation resistance sensor attached on a rotating part of a steering wheel (not shown), or an angle sensor attached on a wheel may be used as the steering sensor 34.

The gyro sensor 35 may detect an angle of traverse of the vehicle. For example, a gas-rate gyro or a vibration gyro may be used as the gyro sensor 35. Also, the direction of the vehicle may be detected by integrating the angle of traverse detected by the gyro sensor 35.

The data storage section 22 may include a hard disk (not shown) as an external storage device and as a storage medium, a navigation traffic information DB 36 and a navigation map information DB 38 which are stored in the hard disk, and a storage head (not shown) as a driver for reading out a predetermined program or for writing predetermined data on the hard disk. Note that, a magnetic disk such as a flexible disk may also, or alternatively, be used as the external storage device instead. Further, a memory card, a magnetic tape, a magnetic drum, a CD, an MD, a DVD, an optical disc, an MO, an IC card, or an optical card may be used as the external storage device as well.

In the navigation traffic information DB 36, road congestion information regarding current road congestion such as length of the congested area, cause of the congestion, and a predicted time when the congestion will be cleared, and/or current traffic information 37A such as traffic regulation information due to road/building construction, which are received from the road traffic information center 5, may be stored. In the navigation traffic information DB 36, statistical traffic information 37B according to past road congestion may be stored. The statistical congestion information 37 may include, for example, event information such as a date and place of a festival, a parade, and/or fireworks. For example, the statistical congestion information 37 may include information about the date and/or time when the event is to be held.

Similarly, statistical congestion information or predicted congestion information such as information that the amount of traffic increases on roads around a station or big commercial facilities during a specific weekday time period, and/or information that the amount of traffic increases on roads around a beach during the summer vacation, may be stored as statistical traffic information 37. In the navigation traffic information DB 36, predicted traffic information 37C, which is created on the basis of current traffic information 37A and statistical traffic information 37B, may be stored. The predicted traffic information 37C may be predicted congestion information at predetermined time intervals in the future on the basis of a current congestion (for example, about every 30 minutes, 1 hour, or 2 hours from a current time).

In the navigation map information DB 38, navigation map information 39 may be stored. The navigation map information 39 may be used for a route search and a route guidance of the navigation apparatus 2 and may be updated by the information distribution center 3. The navigation map information 39 may include various types of information, which are necessary for a route guidance and map display, like update map information 18. For example, newly created road information to specify a newly created road, map display data for displaying a map, intersection data for intersections, node data for node points, link data for roads links, facility data, search data for searching for a route, shop data for POIs such as a shop as one type of facility, and/or point detection data for detecting points may be included. Note that, the details of each type of data have been described above, so that the details are not described here. The navigation map information DB 38 may be updated by downloading update information from the information distribution center 3 through the communication device 27.

As shown in FIG. 2, the navigation control section 23 of the navigation apparatus 2 may include a CPU 41 as a calculating device and a control device for controlling the entire navigation apparatus 2, a RAM 42 for use as a working memory when the CPU 41 executes various types of calculation and for storing route data according to a searched route and a congested section travel time received from the information distribution center 3, a ROM 43 for storing a vehicle position information transferring processing program to transfer a vehicle position to the information distribution center 3 at predetermined time intervals (e.g., at about 30-second intervals). The navigation control section 23 of the navigation apparatus 2 may include an internal storage device such as a flash memory 44 for storing the program read out from the ROM 43, and a timer 45 for measuring time. Note that, a semiconductor memory or a magnetic core may be used as the RAM 42, the ROM 43, or the flash memory 44. Also, an MPU may be used as the calculating device and the control device instead of the CPU 41.

Various programs may be stored in the ROM 43 and various types of data may be stored in the data storage section 22. However, programs and data may be read out from the same external storage device or a memory card and may be written on the flash memory 44, so that the programs and data may be updated by replacing the memory card.

Support equipment (actuators) such as the operating section 24, the LCD display 25, the speaker 26, or the communication device 27 may be electrically connected to the navigation control section 23.

The operating section 24 may be operated when the operator wants to correct a current position, when the operator inputs a starting point as a guidance starting point or a destination as a guidance ending point, and/or when the operator searches for information according to facilities. The operating section 24 may be various types of key or a plurality of operation switches. The navigation control section 23 may control various types of operations on the basis of output switch signals such as pressing switches. Note that, as the operating section 24, a keyboard, a mouse, a barcode reader, a remote control device, a joystick, a light pen, and/or a stylus pen may be used. Further, a touch panel displayed on the LCD display 25 may be used as the operating section 24.

On the LCD display 25, a route guidance screen in which a map on the basis of the navigation map information 39 is displayed as well as traffic information regarding links, an operation guidance, an operation menu, a key guidance, a route from a current position to a destination, guidance information along the route, traffic information, news, weather reports, date and time, mails, and/or TV programs may be displayed. Note that, a CRT display, a plasma display, or a hologram device for projecting hologram images on a windshield of the vehicle may be used instead of the LCD display 25.

The speaker 26 may output an audio guidance for a traveling route on the basis of control by the navigation control section 23. For example, the audio guidance may be, for example, "please turn right at XX intersection 200 meters ahead" or "congestion ahead on Route XX." Note that, the audio guidance output from the speaker 26 may be not only a synthetic sound but also various types of sound effects or various types of guidance information prerecorded on a tape or a memory.

The communication device 27 may communicate with the information distribution center 3 and may exchange the latest version of update map information with the information distribution center 3. The communication device 27 may also receive traffic information, for example, congestion information, regulation information, parking area information, traffic accident information, and/or service area congestion information, transferred from the road traffic information center 5 as well as information from the information distribution center 3.

Next, an exemplary vehicle position information transfer method and an exemplary congested section travel time distribution method will be described with reference to FIGS. 3-6. The exemplary methods may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

For example, the exemplary vehicle position information transfer method (Steps S11-S14) may be stored in the RAM 42 or the ROM 43 of the navigation apparatus 2 and may be executed by the CPU 41 of the navigation apparatus 2 in order to transfer vehicle position information to the information distribution center 3 at predetermined time intervals (for example, at about 30 seconds intervals). Similarly, the exemplary congested section travel time distribution method (Steps S111-S114) may be stored in the RAM 12 or the ROM 13 of the information distribution center 3 and may be executed by the CPU 11 of the information distribution center 3 when vehicle position information is received from the navigation apparatus 2.

Figure 3:
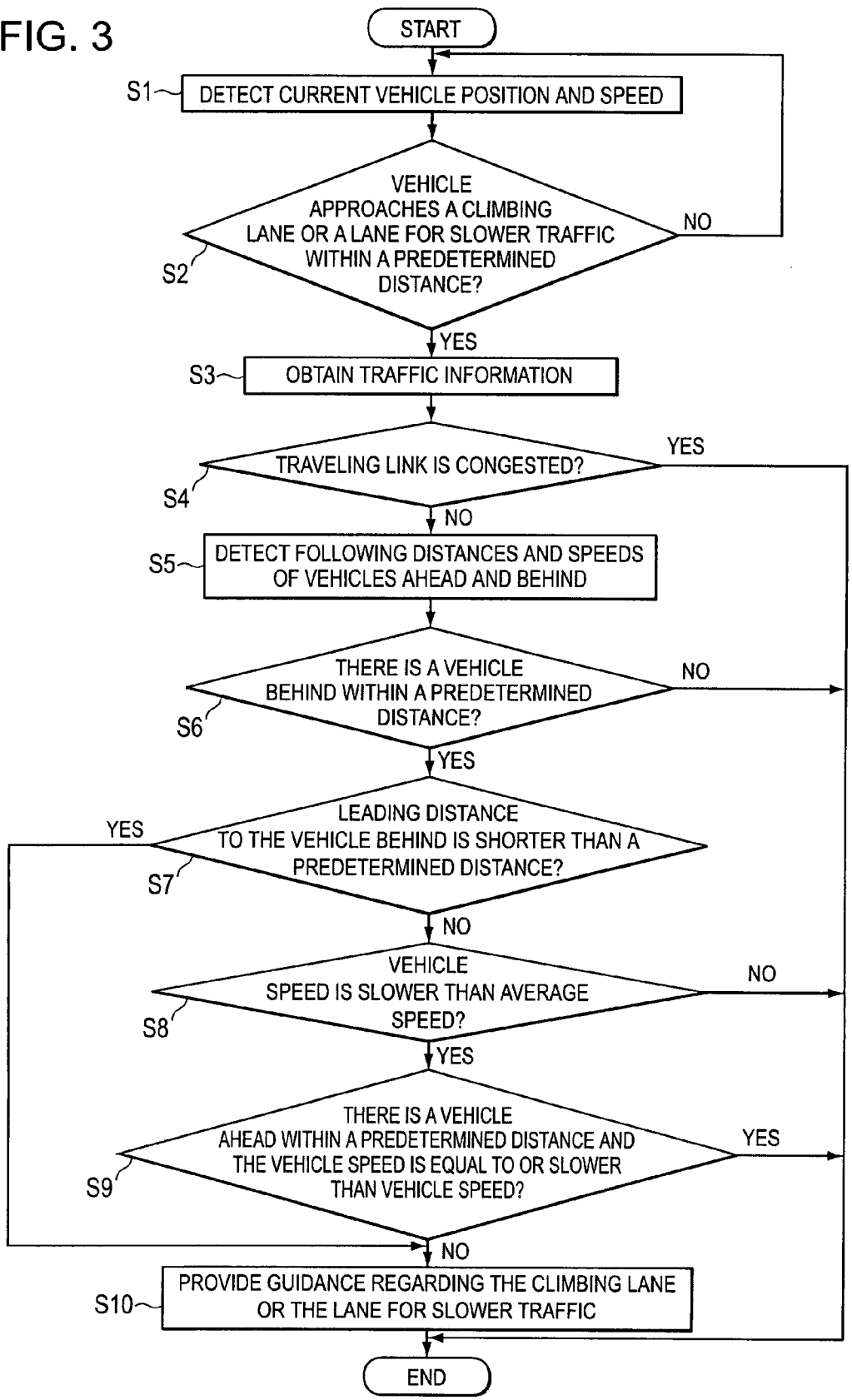
FIG. 3 is a flowchart showing an exemplary vehicle position information transfer method and an exemplary congested section travel time distribution method.

As shown in FIG. 3, in Step 11 (hereinafter referred to as S11), the CPU 41 detects a current position of the vehicle (hereinafter referred to as "vehicle position") by the current position detecting processing section 21 and stores coordinate data according to the current vehicle position (for example, data regarding latitude and longitude) in the RAM 42. For example, the CPU 41 may read out a passing time at the vehicle position from the timer 45 and stores the passing time as passing time data in the RAM 42. Further, the CPU 41 may read out a road link ID of the road link on which the vehicle position is located and road type data (for example, data according to highways, urban highways, tollways, national roads, and/or prefectural roads) from the navigation map information 39 and may store them in the RAM 42.

In S12, the CPU 41 reads out transferring time data indicating a time when the last vehicle position information was transferred to the information distribution center 3 from the RAM 42 and determines whether it has been a predetermined time period (a predetermined first time period) (for example, about 30 seconds) since the last transfer time. When it has not been the predetermined time period since the time when the last vehicle position information was transferred to the information distribution center 3 (S12=NO), the method ends.

Meanwhile, when it has been the predetermined time period since the time when the last vehicle position information was transferred to the information distribution center 3 (S12=YES), the CPU 41 executes a processing in S13. In S13, the CPU 41 reads out coordinate data indicating the latest vehicle position, passing time data, the road link ID of the road link on where the vehicle is located, and road type data stored in the RAM 42, and transfers such data as "vehicle position information" together with the navigation ID of the navigation apparatus 2 to the information distribution center 3. In S14, the CPU 41 reads out current time data from the timer 45 and stores the current time as transfer time data when vehicle position information is transferred to the information distribution center 3 in the RAM 42. Then the method is terminated. The method may be continually repeated or repeated at predetermined time intervals.

In S111, the CPU 11 determines whether the CPU 11 receives vehicle position information from the navigation apparatus 2 in S13. When the CPU 11 does not receive vehicle position information (S111=NO), the CPU 11 terminates the procedure. When the CPU 11 receives the vehicle position information (S111=YES), the CPU 11 may store vehicle position information as new vehicle position information in the RAM 12 and the method continues to S112. In S112, the CPU 11 reads out new vehicle position information from the RAM 12, reads out the navigation ID corresponding to stored new vehicle position information, and specifies that the apparatus which transferred the vehicle position information stored as the new vehicle position information was the navigation apparatus 2. Then, the CPU 11 reads out "vehicle position information" which was transferred from the same navigation apparatus 2 a predetermined time period before (for example, about 30 seconds before) from the RAM 12 as previous vehicle position information. The CPU 11 may read out road link IDs from both of the previous vehicle position information and the new vehicle position information, and may read out congestion information corresponding to the two road link IDs from the current traffic information 19A.

The CPU 11 reads out a congestion coefficient corresponding to congestion degrees of the two of congestion information from the ROM 13 and stores the congestion coefficient in the RAM 12 to calculate a congested section travel time. The CPU 11 then calculates the congested section travel time necessary for passing through the congested section on the basis of the previous vehicle position information, the new vehicle position information, and the congestion coefficient corresponding to the congestion degrees of congestion information (see e.g., FIGS. 4 through 6) and stores the congested section travel time associating with the congested section, on which the navigation apparatus 2 traveled, in the section travel time DB 20.

For example, when the congestion degree of congestion information read out from the current traffic information 19A is "not congested," the CPU 11 may read out a congestion coefficient "1," which corresponds to "not congested" from the ROM 13 and may store the congestion coefficient in the RAM 12 to calculate the new congested section travel time. When the congestion degree of congestion information read out from the current traffic information 19A is "crowded," the CPU 11 may read out a congestion coefficient "2," which corresponds to "crowded" from the ROM 13 and may store the congestion coefficient in the RAM 12 to calculate a new congested section travel time. When the congestion degree of congestion information read out from the current traffic information 19A is "congested," the CPU 11 may read out a congestion coefficient "3," which corresponds to "congested" from the ROM 13 and may store the congestion coefficient in the RAM 12 to calculate a new congested section travel time.

Figure 4:
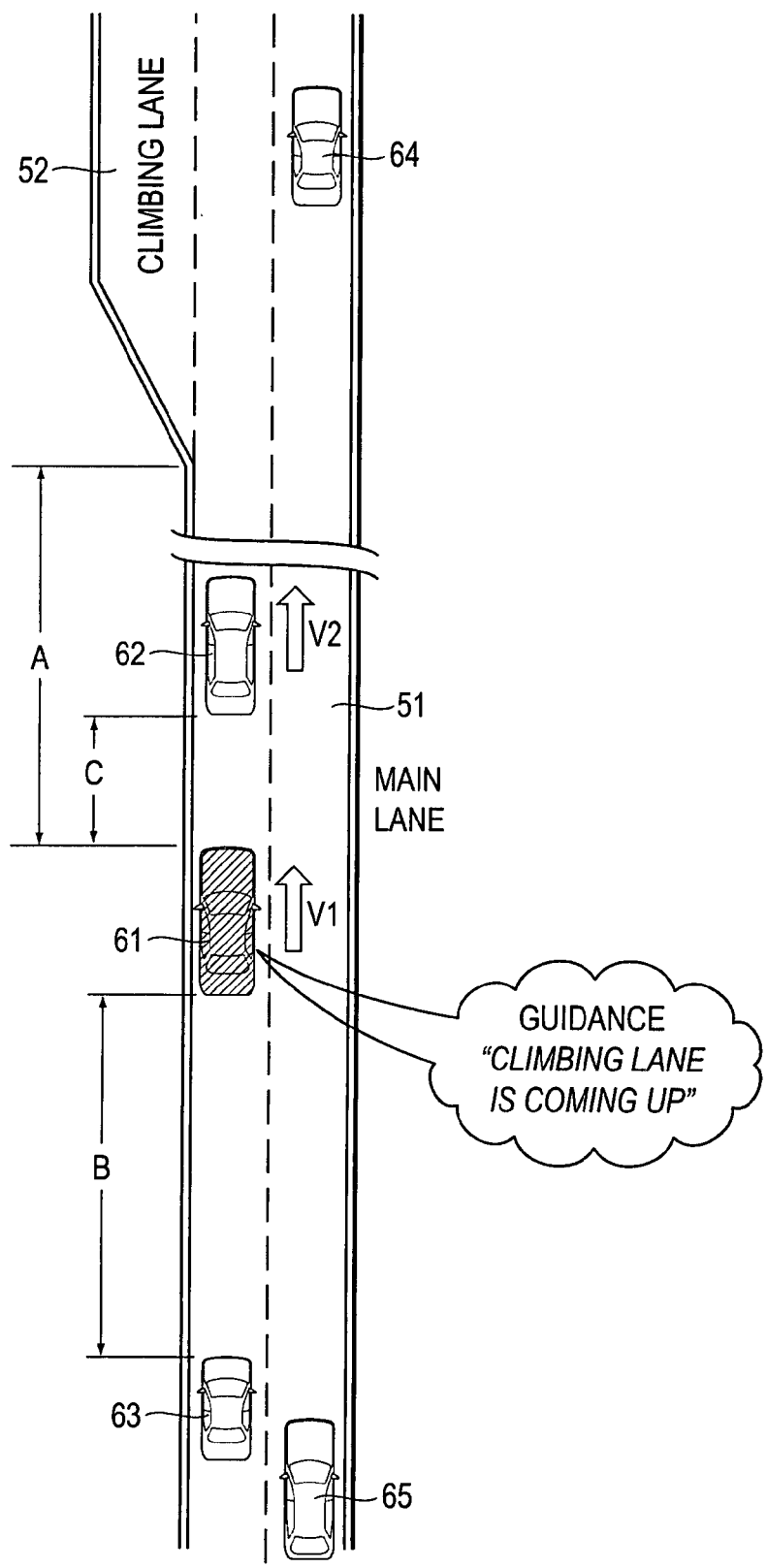
FIGS. 4-6 are a diagrams showing an example of a calculation of a congested section travel time.
Figure 5:
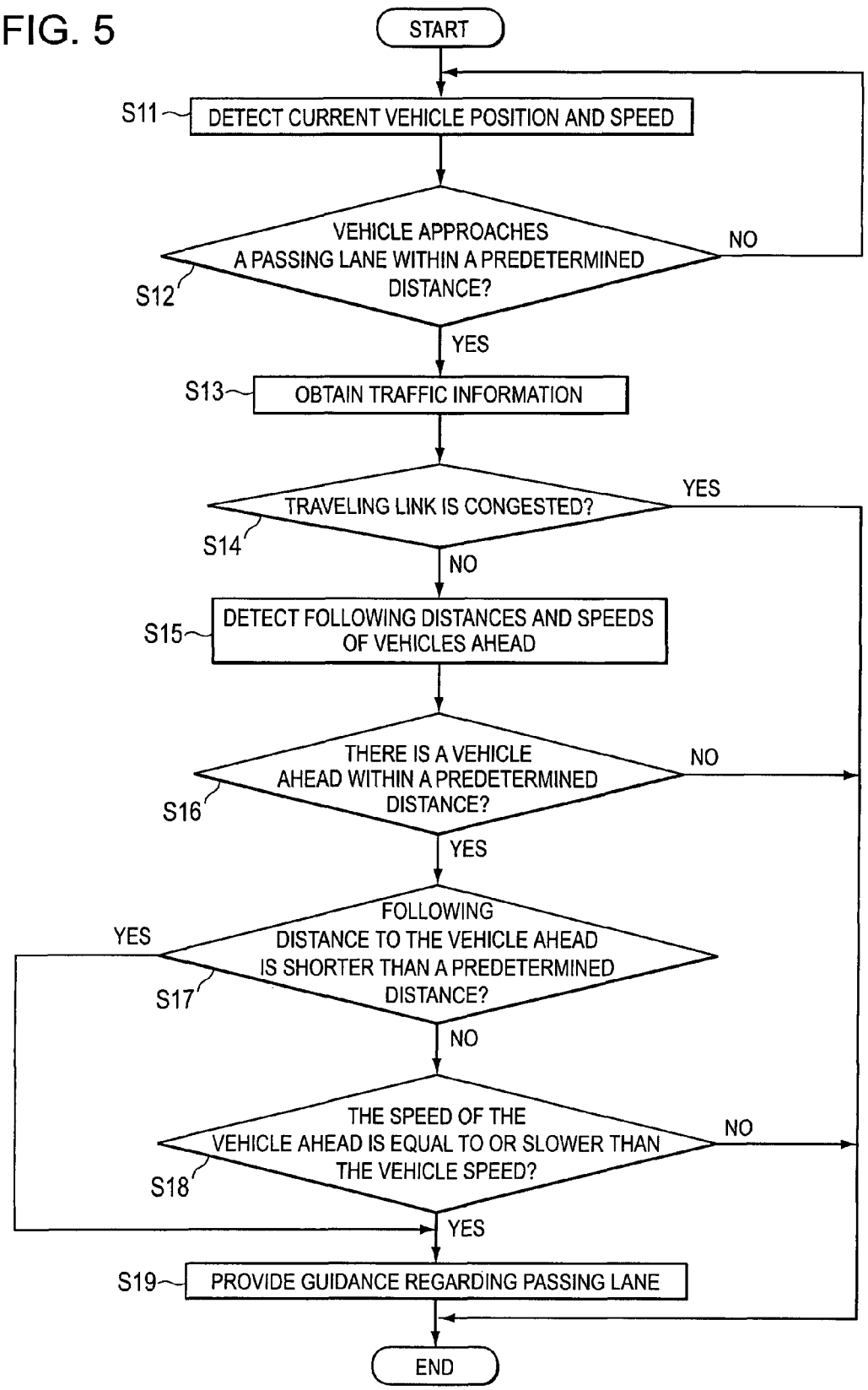
Figure 6:
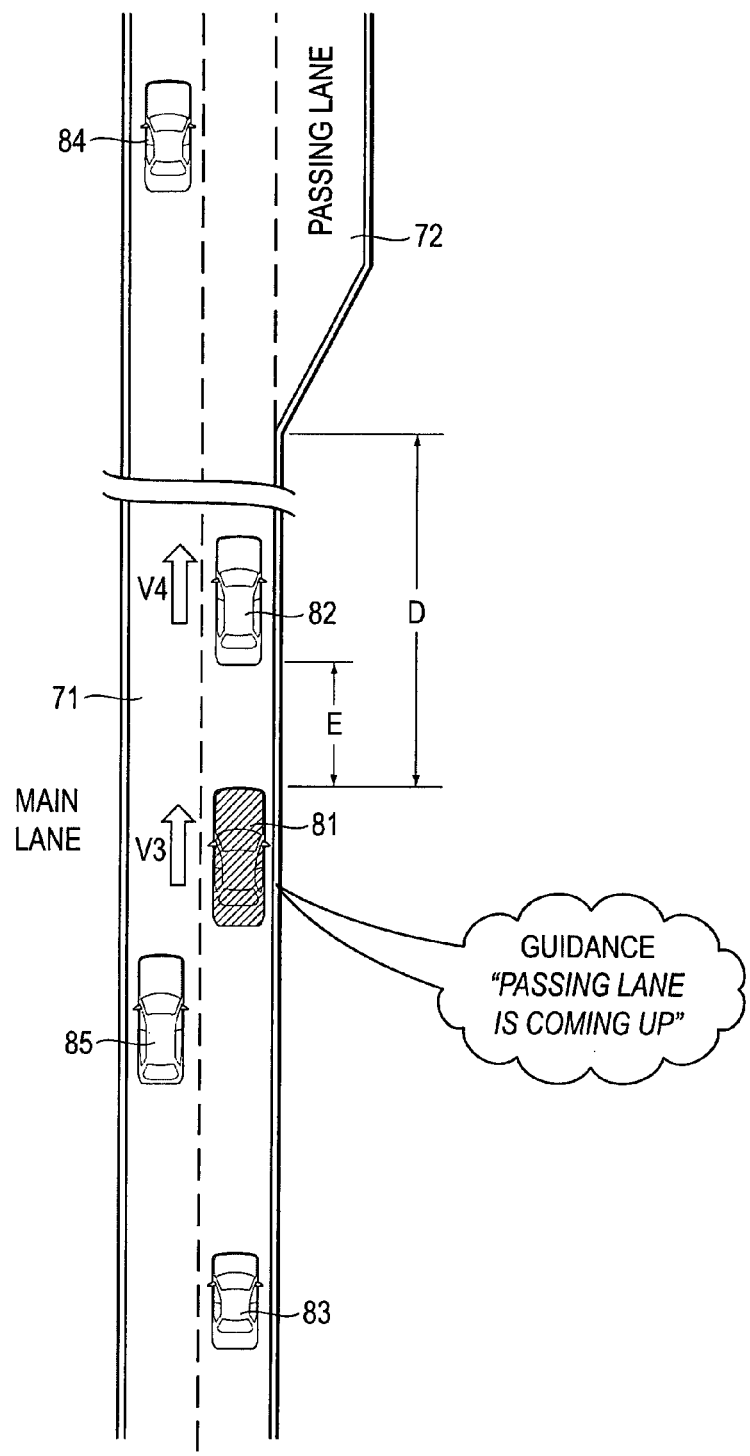

An exemplary method for calculating the congested section travel time necessary for passing through the congested section executed by the CPU 11 in S112 will be described with reference to FIGS. 4-6. FIG. 4 shows the calculation of a travel time for a congested section X1 on the basis of two pieces of vehicle position information from the navigation apparatus 2; one is received at a point A located before the congested section X1 and the other is received at a point B located within the congested section X1. FIG. 5 is the continuation of FIG. 4. The diagram in FIG. 5 shows the calculation of the travel time for the congested section on the basis of vehicle position information, which is received at a point C located within the congested section X1 from the navigation apparatus 2, that is the second information within the congested section X1. FIG. 6 is the rest of FIG. 5. The diagram in FIG. 6 shows the calculation of the travel time for the congested section X1 on the basis of vehicle position information, which is received from the navigation apparatus 2 at a point D, which is located after the congested section X1.

First, the calculation of a congested section travel time executed by the CPU 11 when the navigation apparatus 2 receives two pieces of vehicle position information; one is received at a point before entering a congested section and the other is received at a point within the congested section, will be described with reference to FIG. 4.

As shown in FIG. 4, the congestion degree of congestion information according to a link R1 between two nodes, N1 and N2, is "not congested." The congestion degree of congestion information according to a link R2 (which is within the congested section X1) between two nodes, N2 and N3, is "congested." The length of the congested section X1 is indicated by the arrow Q. The congestion degree of congestion information according to a link R3 between two nodes, N3 and N4, is "not congested." The CPU 41 of the navigation apparatus 2 transfers two pieces of vehicle position information to the information distribution center 3 at about 30 seconds intervals. The first piece of information (previous vehicle position information) is at the point A on the link R1 before entering the congested section X1 and the other piece of information (new vehicle position information) is at the point B on the link R2 within the congested section X1.

The CPU 11 of the information distribution center 3 reads out the navigation ID of the navigation apparatus 2 from both of and new vehicle position information, and specifies which version of map information is stored in the navigation apparatus 2, on the basis of a navigation update history information DB 15. Further, according to the version of map information stored in the navigation apparatus 2, the CPU 11 specifies which update map information 18 should be used to calculate the congested section travel time of the congested section X1. The CPU 11 reads out coordinate data of the point A and the point B, reads out link R1 data, link R2 data, and node N2 data from the specified update map information 18, calculates a travel distance "a" between the point A and the node N2 and a travel distance "b" (a first travel distance) between the node N2 and the point B, and stores the calculated travel distances in the RAM 12. The CPU 11 further reads out the road link ID of the link R2 from new vehicle position information, and reads out congestion information corresponding to the road link ID from the current traffic information 19A. When the congestion degree of congestion information read out from the current traffic information 19A is "congested," the CPU 11 reads out the congestion coefficient "3" indicating "congested" from the ROM 13 and stores the congestion coefficient in the RAM 12 to calculate the congested section travel time for the congested section X1. Further, the CPU 11 reads out passing time data at both of the point A and the point B from previous vehicle position information and new vehicle position information, calculates the travel time from the point A to the point B which is "30 seconds," and stores the travel time in the RAM 12.

As shown in FIG. 4, the CPU 11 clarifies the weight of the congestion of the travel distance "b" by multiplying the congestion coefficient "3." The CPU 11 calculates a travel time (the first travel time) necessary for the travel distance "b" which is from the node N2 to the point B in the following way: the travel time from the point A to the point B, which is "30 seconds," over the sum of the travel distance "a" plus the weighted travel distance (b×3) times the weighted travel distance (b×3) equals the travel time (the first travel time) of the travel distance "b" which is from the node N2 to the point B. The CPU 11 stores the calculated travel time (the first travel time) of the travel distance "b" which is from the node N2 to the point B in the RAM 12.

Further, the CPU 11 reads out link length data of the link R2, that is, distance data of the congested section X1 from the update map information 18 and calculates the congested section travel time for the congested section X1 (a predicted travel time in this case) in the following way. The travel time (the first travel time) of the travel distance "b" which is from the node N2 to the point B times the distance of the congested section X1 (b+f1) over the travel distance "b" which is located on the link R2. Then the CPU 11 stores the congested section travel time for the congested section X1 (the predicted travel time) in the section travel time DB 20.

Next, the calculation of the travel time for the congested section X1 on the basis of the second vehicle position information received from the navigation apparatus 2 at the point C within the congested section X1 will be described with reference to FIG. 5. Note that, the same reference numerals as the structure in FIG. 4 are applied for identical parts or corresponding parts in FIG. 5. As shown in FIG. 5, the CPU 11 reads out coordinate data of the point B (previous vehicle position information) and the point C (new vehicle position information), further reads out link data of the link R2 and node data of the nodes N2 and N3 from the update map information 18, calculates both of the travel distance "b" (the first travel distance) between the node N2 and the point B and the travel distance "c" between the point B and the point C, and stores the two distances in the RAM 12. The CPU 11 further reads out passing time data at the point B and at the point C from previous vehicle position information and new vehicle position information, calculates the travel time between the point B and the point C, that is, "30 seconds," and stores the calculated travel time in the RAM 12.

As shown in FIG. 5, the CPU 11 reads out the travel time of the travel distance "b" (the first travel time) from the RAM 12 and calculates a travel time (a second travel time) between the node N2 and the point C by adding a travel time between the point B and the point C, that is, "30 seconds" to the travel time (the first travel time). Specifically, the CPU 11 calculates the travel time between the node N2 and the point C (the second travel time) in the following way. The travel time from the point A to the point B which is "30 seconds" over the sum of the travel distance "a" plus the weighted travel distance (b×3) times the weighted travel distance (b×3) (equals the travel time (the first travel time) of the travel distance "b" from the node N2 to the point B) plus the travel time from the point B to the point C which is "30 seconds" equals the travel time from the node N2 to the point C (the second travel time). The calculated second travel time is stored in the RAM 12.

Further, the CPU 11 reads out link length data of the link R2, that is, distance data of the congested section X1, from the update map information 18, and calculates the congested section travel time of the congested section X1 in the following way. The travel time from the node N2 to the point C (the second travel time) times the distance of the congested section X1 (b+C+f2) over the travel distance from the node N2 to the point C (b+c) equals the congested section travel time of the congested section X1. The calculated congested section travel time of the congested section X1 is stored and updated in the section travel time DB 20.

Next, the calculation of the travel time of the congested section X1 on the basis of vehicle position information received from the navigation apparatus 2 at the point D where the navigation apparatus gets out of the congested section X1 will be described with reference to FIG. 6. Note that, the same reference numerals as the structure in FIGS. 4 and 5 are applied for identical parts or corresponding parts in FIG. 6. As shown in FIG. 6, the CPU 11 reads out coordinate data of the point C (previous vehicle position information) and the point D (new vehicle position information), further reads out link data of the link R2 and R3 and node data of the node N3 from the update map information 18, calculates two travel distances, i.e., a travel distance "f2" (a second travel distance) between the point C and the node N3 and a travel distance "d" between the node N3 and the point D, and stores the distances in the RAM 12. The CPU 11 further reads out passing time data of the point C and the point D from previous vehicle position information and new vehicle position information, calculates the travel time between the point C and the point D, that is, "30 seconds," and stores the calculated travel time in the RAM 12.

The CPU 11 reads out the congestion coefficient "3" and the travel distance "f2" (the second travel distance) of the congested section X1 from the RAM 12 to classify the weight of the travel distance "f2" by multiplying the travel distance "f2" (the second travel distance) by the congestion coefficient "3." The CPU 11 calculates a travel time (a third travel time) of the travel distance "f2" (the second travel distance) from the point C to the node N3 in the following way. The travel time from the point C to the point D which is "30 seconds" over the travel distance "d" plus the weighted travel distance (f2×3) times the weighted travel distance (f2×3). The travel time (the third travel time) of the travel distance "f2" (the second travel distance) from the point C to the node N3 is stored in the RAM 12.

The CPU 11 reads out the travel time (the second travel time) from the node N2 to the point C, calculates the congested section travel time of the congested section X1 by adding the travel time (the third travel time) from the point C to the node N3 to the travel time (the second travel time), and stores and updates the congested section travel time of the congested section X1 in the section travel time DB 20. Specifically, the CPU 11 calculates the congested section travel time of the congested section X1 in the following way. The travel time from the point A to the point B which is "30 seconds" over the sum of the travel distance "a" plus the weighted travel distance (b×3) times the weighted travel distance (b×3) (equals the travel time (the first travel time) of the travel distance "b") plus the travel time from the point B to the point C which is "30 seconds" times the travel time (the third travel time) from the point C to the node N3. The congested section travel time of the congested section X1 is stored and updated in the section travel time DB 20.

Returning to FIG. 3, the CPU 11 determines whether a request to distribute a congested section travel time stored in the section travel time DB 20 is received from the navigation apparatus 2 together with the navigation ID of the navigation apparatus 2 in S13. When the request to distribute the congested section travel time stored in the section travel time DB 20 is not received from the navigation apparatus 2 (S113=NO), the CPU 11 terminates the method. When the request to distribute the congested section travel time stored in the section travel time DB 20 is received from the navigation apparatus 2 together with the navigation ID of the navigation apparatus 2 (S113=YES), the CPU 11 executes a processing described in S114. In S114, the CPU 11 distributes the congested section travel time stored in the section travel time DB 20 to the navigation apparatus 2 because the navigation apparatus 2 was specified by the navigation ID, and the procedure is terminated.

As described in detail above, according to the exemplary navigation system 1, the CPU 41 of the navigation apparatus 2 may transfer coordinate data indicating the latest vehicle position, passing time data, and road link ID data and road type data according to the road on which the vehicle is currently located stored in the RAM 42 at predetermined time intervals (for example, at about 30 second intervals) to the information distribution center 3 together with the navigation ID to specify the navigation apparatus all together as "vehicle position information" (S11 through S14).

When the CPU 11 of the information distribution center 3 receives vehicle position information from the navigation apparatus 2, the CPU 11 stores the information as "new vehicle position information" in the RAM 12, reads out the navigation ID for the vehicle position information, and specifies that the vehicle position information was transferred by the navigation apparatus 2. In response, the CPU 11 reads out vehicle position information, which was previously received from the navigation apparatus 2 a predetermined time ago (for example, about 30 seconds ago) from the RAM 12 as "previous vehicle position information" in the RAM 12. The CPU 11 reads out road link IDs from both of "previous vehicle position information" and "new vehicle position information" and further reads out congestion information corresponding to the road link IDs from the current traffic information 19A.

The CPU 11 calculates the congested section travel time of the congested section X1 on which the navigation apparatus 2 traveled on the basis of "previous vehicle position information," "new vehicle position information," and congestion information, and stores the congested section travel time in the section travel time DB 20 to correspond with the congested section X1. When the navigation apparatus 2 requests a congested section travel time from the information distribution center 3, the CPU 11 distributes the congested section travel time of the needed congested section stored in the section travel time DB 20 to the navigation apparatus 2 (S111 through S114).

That is, the procedure described above is summarized as follows. The navigation apparatus 2 transfers vehicle position information to the information distribution center 3 at predetermined time intervals (for example, at about 30 seconds intervals), so that the information distribution center 3 may calculate a congested section travel time necessary for passing through the congested section X1 on the basis of "previous vehicle position information" and "new vehicle position information," both obtained at least at predetermined time intervals (for example, at about 30 seconds intervals).

The information distribution center 3 may thus distribute the congested section travel time to a navigation apparatus 2, which is mounted on another vehicle and which will be not currently traveling on the congested section X1. Further, the navigation apparatus 2 in the vehicle which is currently traveling on the congested section X1 may obtain the congested section travel time necessary for passing through the congested section X1 from the information distribution center 3 during traveling within the congested section X1, so that the navigation apparatus 2 may predict a quite accurate arrival time to a destination on the basis of the latest congested section travel time necessary for passing through the congested section X1.

When the information distribution center 3 obtains vehicle position information from the navigation apparatus 2 located within the congested section X1 at predetermined time intervals (for example, at about 30 seconds intervals), the information distribution center 3 may recalculate the congested section travel time, update the congested section travel time necessary for passing through the congested section X1, and distribute a quite accurate congested section travel time to the navigation apparatus 2 which is mounted on another vehicle and which is not currently traveling in the congested section X1. The navigation apparatus 2 which is currently traveling within the congested section X1 may obtain the congested section travel time which is updated at predetermined time intervals from the information distribution center 3, so that the navigation apparatus 2 may predict a quite accurate arrival time to a destination on the basis of the latest congested section travel time necessary for passing through the congested section X1.

The information distribution center 3 may update the congested section travel time necessary for passing through the congested section X1 on the basis of previous vehicle position information which was received from the navigation apparatus within the congested section X1 for last and new vehicle position information, which was received after the navigation apparatus passed through the congested section X1, so that the information distribution center 3 may distribute a quite accurate congested section travel time to the navigation apparatus 2 which is mounted on another vehicle and which is not currently traveling in the congested section X1.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, instead of the procedure in S113 through S114, the CPU 11 of the information distribution center 3 may distribute congested section travel times of congested sections stored in the congested section travel time DB 20 to all of the navigation apparatuses 2 registered in the information distribution center 3 at predetermined time intervals (for example, at about 5 through 10 minutes intervals). Therefore, each of the navigation apparatuses 2 may obtain the latest congested section travel time stored in the section travel time DB 20 from the information distribution center 3 at predetermined time intervals, so that it may be possible for each of the navigation apparatuses 2 to predict a quite accurate arrival time to a destination.

Instead of the procedure in S113 through S114, the CPU 11 of the information distribution center 3 may receive vehicle position information from the navigation apparatus 2, and distribute congested section travel times of congested sections stored in the section travel time DB 20 to each of the navigation apparatuses 2 registered in the information distribution center 3 every time when the congested section travel times of congested sections stored in the section travel time DB 20 are updated. Therefore, each of the navigation apparatuses 2 may obtain the latest congested section travel time stored in the section travel time DB 20 from the information distribution center 3, so that it may be possible for each of the navigation apparatuses 2 to predict a quite accurate arrival time to a destination.

Instead of the procedure in S12, the CPU 41 of the navigation apparatus 2 may determine whether the vehicle has traveled a predetermined distance (for example, about 500 meters) since the CPU 41 transferred vehicle position information to the information distribution center 3. When the vehicle has not been traveling the predetermined distance, the procedure may be terminated. When the vehicle has traveled the predetermined distance, the procedure may go to S13. Therefore, the navigation apparatus 2 may obtain vehicle position information during traveling within a congested section and transfer vehicle position information to the information distribution center 3.

Instead of the procedure in S13 described above, the CPU 41 of the navigation apparatus 2 may transfer not link ID data and road type data according to the position where the vehicle is located now but coordinate data and passing time data to the information distribution center 3 as "vehicle position information." In this case, the information distribution center 3 may specify the link ID on the basis of coordinate data transferred from the navigation apparatus 2 and update map information 18 in S112 and read out congestion information corresponding to the specified link ID from the current traffic information 19A. Therefore, it may be possible to reduce amount of data to be transferred from the navigation apparatus 2 to the information distribution center 3.

According to the examples described above, the CPU 11 of the information distribution center 3 receives vehicle position information of the navigation apparatus 2 at the point A, the point B, the point C, and at the point D and sequentially calculates congested section travel times of the congested section X1 as shown in FIGS. 4-6. However, as shown in FIG. 7, the CPU 11 may also calculate the congested section travel time (predicted travel time in this case) of the congested section X1 and store the congested section travel time in the section travel time DB 20 even when the CPU 11 receives vehicle position information of the navigation apparatus 2 at the point A on the link R1 which is before the congested section X1 and at the point D on the link R3 which is after the congested section X1 at about 30 seconds intervals.

Specifically, the CPU 11 of the information distribution center 3 may read out coordinate data of the point A and the point D on the basis of previous vehicle position information at the point A and new vehicle position information at the point D as well as link data of the link R1, R2, and R3 and node data of N2 and N3 from the specified update map information 18. The CPU 11 may calculate the travel distance "a" which is from the point A to the node N2, the travel distance "f3" (the first travel distance) in the congested section X1 which is from the node N2 to the node N3, and the travel distance "d" which is from the node N3 to the point D and stores the travel distances in the RAM 12. The CPU 11 may further read out passing time data of the point A and the point D on the basis of previous vehicle position information and new vehicle position information, calculate the travel time necessary for traveling from the point A to the point D which is "30 seconds," and stores the calculated travel time in RAM 12.

Figure 7:
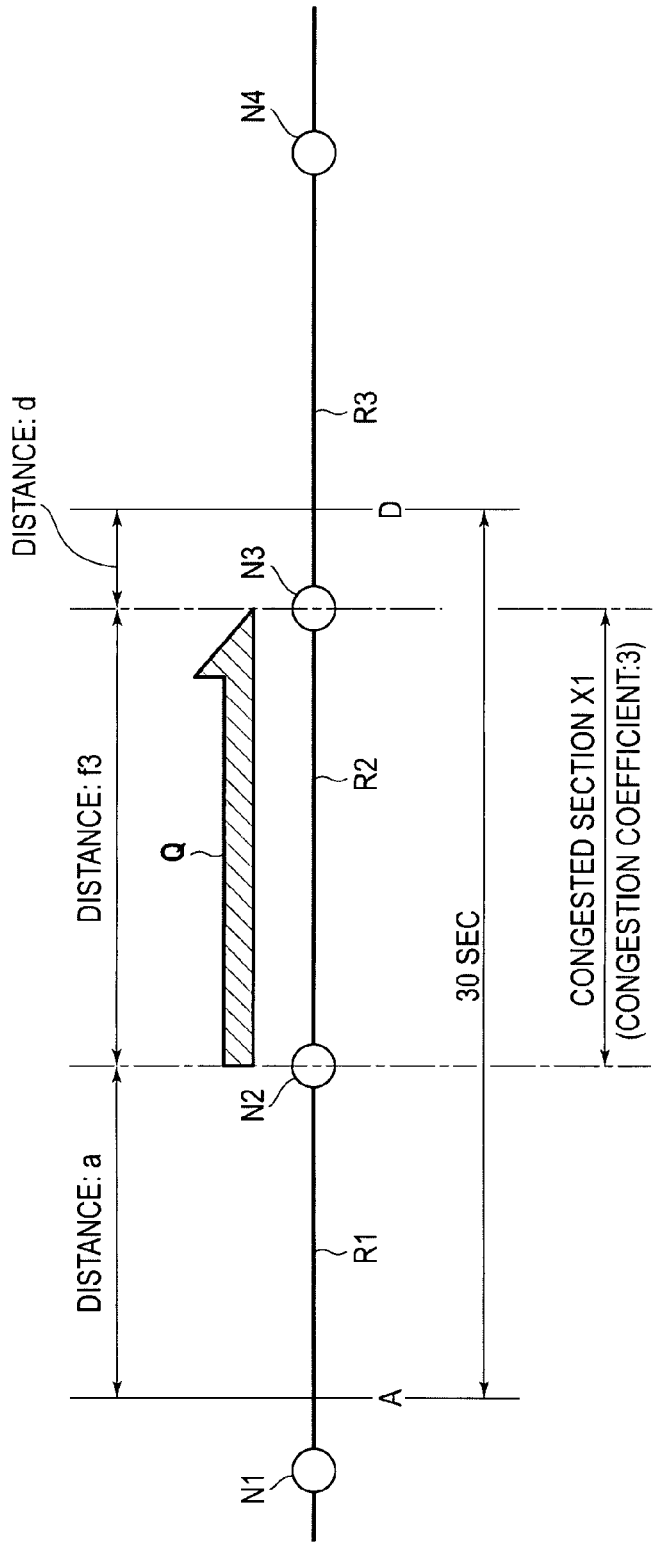
FIG. 7 is a diagram showing an example of a calculation of a congested section travel time.

As shown in FIG. 7, the CPU 11 classifies the weight of the travel distance "f3" by multiplying the congestion coefficient "3." The CPU 11 calculates the travel time (the first travel time) of the travel distance "f3" which is from the node N2 to the node N3 in the congested section X1 in the following way. The travel time from the point A to the point D which is "30 seconds" over the sum of the travel distance "a" plus the weighted travel distance (f3×3) plus the travel distance "d" times the weighted travel distance (f3×3). The first travel time is stored as the congested section travel time of the congested section X1 (a predicted travel time in this case) in the section travel time DB 20.

Therefore, the information distribution center 3 may update the congested section travel time necessary for passing through the congested section X1 on the basis of previous vehicle position information received from the navigation apparatus before the navigation apparatus enters the congested section X1 and new vehicle position information received after the navigation apparatus passes through the congested section X1, so that it may be possible to distribute a quite accurate congested section travel time even to the navigation apparatus 2 which is not currently traveling in the congested section X1.

What is claimed is:

1. An information distribution center for use with a navigation apparatus, the navigation apparatus including a communication device that transfers a piece of vehicle position information to the information distribution center, the piece of vehicle information including a vehicle position and a time when the vehicle passes through the vehicle position, the information distribution center comprising:
    a communication device that receives pieces of vehicle position information and traffic information including congestion information and distributes a calculated congested section travel time;
    a memory that stores the received pieces of vehicle position information in order of arrival; and
    a controller that:
        specifies a congested section based on the congestion information;
        weights a first travel distance within the congested section according to the congestion information about the congested section, the first travel distance calculated based on two of the received pieces of vehicle position information received from the navigation apparatus and the congestion information about the congested section;
        calculates a first travel time corresponding to the first travel distance; and
        calculates the congested section travel time necessary for passing through the congested section based on the calculated first travel time.

2. The information distribution center of claim 1, wherein:
    one of the two pieces of vehicle position information is received from the navigation apparatus before the navigation apparatus enters the congested section;
    the other of the two pieces of vehicle position information is received from the navigation apparatus when the navigation apparatus is located within the congested section;
    the controller calculates the first travel distance between a start point of the congested section and a vehicle position according to the piece of vehicle position information which is received when the navigation apparatus is located within the congested section;
    the controller calculates a travel time from a vehicle position according to the piece of vehicle position information which is received before the navigation apparatus enters the congested section to the vehicle position according to the piece of vehicle position information which is received when the navigation apparatus is located within the congested section;
    the controller calculates the first travel time based on:
        the calculated travel time;
        a travel distance between the vehicle position according to the piece of vehicle position information which is received before the navigation apparatus enters the congested section and the start point of the congested section; and
        the weighted first travel distance; and
    the controller calculates the congested section travel time based on the calculated first travel time, the calculated first travel distance, and a distance of the congested section.

3. The information distribution center of claim 2, wherein:
when an additional piece of vehicle position information is received from the navigation apparatus that is within the congested section:
    the controller calculates a travel time from a vehicle position according to a previous piece of vehicle position information which is received when the navigation apparatus is located within the congested section to a vehicle position according to the additional piece of vehicle position information;
    the controller calculates a second travel time by adding the calculated travel time from the vehicle position according to the previous piece of vehicle position information to the vehicle position according to the additional piece of vehicle position information to the first travel time; and
    the controller calculates the congested section travel time based on:
        the second travel time;
        the distance between the start point of the congested section and the vehicle position according to the additional piece of vehicle position information; and
        the distance of the congested section.

4. The information distribution center of claim 3, wherein:
when a piece of vehicle position information is received from the navigation apparatus after the navigation apparatus has passed through the congested section,
    the controller calculates a travel time from a vehicle position according to a last piece of vehicle position information that is received from the navigation apparatus within the congested section to a vehicle position according to the piece of vehicle position information that is received from the navigation apparatus after the navigation apparatus has passed through the congested section;
    the controller calculates a second travel distance between the vehicle position according to the last piece of vehicle position information and an end point of the congested section the controller weights the second travel distance according to the congestion information about the congested section;

the controller calculates a third travel time corresponding to the second travel distance based on:

the calculated travel time from the vehicle position according to the last piece of vehicle position information to the vehicle position according to the piece of vehicle position information that is received from the navigation apparatus after the navigation apparatus has passed through the congested section;

the weighted second travel distance; and a travel distance between the end point of the congested section and the vehicle position according to the piece of vehicle position information that is received from the navigation apparatus after the navigation apparatus has passed through the congested section; and the controller calculates the congested section travel time by adding the third travel time to the second travel time.

5. The information distribution center of claim 1, wherein:

one of the two pieces of vehicle position information is received from the navigation apparatus before the navigation apparatus enters the congested section;

the other of the two pieces of vehicle position information is received from the navigation apparatus after the navigation apparatus passes through the congested section section;

the controller calculates the first travel distance between a start point of the congested section and an end point of the congested section;

the controller calculates a travel time from a vehicle position according to the piece of vehicle position information which is received between the navigation apparatus enters the congested section to the vehicle position according to the piece of vehicle position information which is received after the navigation apparatus passes through the congested section;

the controller calculates the first travel time as the congested section travel time based on:

the calculated travel time;

a travel distance between the vehicle position according to the piece of vehicle position information which is received before the navigation apparatus enters the congested section and the start point of the congested section;

a travel distance between the end point of the congested section and the vehicle position according to the piece of vehicle position information which is received after the navigation apparatus passes through the congested section; and the weighted first travel distance.

6. The information distribution center of claim 1, wherein:

when the information distribution center receives a request to distribute the congested section travel time from the navigation apparatus, the controller causes the communication device to distribute the congested section travel time to the navigation apparatus.

7. The information distribution center of claim 1, wherein:

the communication device distributes the congested section travel time to the navigation apparatus at a predetermined interval different from the predetermined time period.

8. The information distribution center of claim 1, wherein:

the communication device distributes the congested section travel time to the navigation apparatus every time the congested section travel time is calculated.

9. A non-transitive computer-readable storage medium storing a set of computer-executable program instructions usable to distribute information, the program comprising:

instructions for transferring a piece of vehicle position information to an information distribution center, the piece of vehicle information including a vehicle position and a time when the vehicle passes through the vehicle position;

instructions for receiving pieces of vehicle position information and traffic information including congestion information;

instructions for storing the received pieces of vehicle position information in order of arrival;

instructions for specifying a congested section based on the congestion information;

instructions for weighting a first travel distance within the congested section according to the congestion information about the congested section, the first travel distance calculated based on two of the received pieces of vehicle position information received from the navigation apparatus and the congestion information about the congested section;

instructions for calculating a first travel time corresponding to the first travel distance;

instructions for calculating the congested section travel time necessary for passing through the congested section based on the calculated first travel time; and instructions for distributing the calculated congested section travel time to a navigation apparatus.

10. An information distribution method, comprising:

transferring a piece of vehicle position information to an information distribution center, the piece of vehicle information including a vehicle position and a time when the vehicle passes through the vehicle position;

receiving pieces of vehicle position information and traffic information including congestion information;

storing the received pieces of vehicle position information in order of arrival;

specifying a congested section based on the congestion information;

weighting a first travel distance within the congested section according to the congestion information about the congested section, the first travel distance calculated based on two of the received pieces of vehicle position information received from the navigation apparatus and the congestion information about the congested section;

calculating a first travel time corresponding to the first travel distance;

calculating the congested section travel time necessary for passing through the congested section based on the calculated first travel time; and distributing the calculated congested section travel time to a navigation apparatus.

11. The information distribution method of claim 10, further comprising:

receiving one of the two pieces of vehicle position information from the navigation apparatus before the navigation apparatus enters the congested section;

receiving the other of the two pieces of vehicle position information from the navigation apparatus when the navigation apparatus is located within the congested section;

calculating the first travel distance between a start point of the congested section and a vehicle position according to the piece of vehicle position information which is received when the navigation apparatus is located within the congested section;

calculating a travel time from a vehicle position according to the piece of vehicle position information which is received before the navigation apparatus enters the congested section to the vehicle position according to the piece of vehicle position information which is received when the navigation apparatus is located within the congested section;

calculating the first travel time based on:
  the calculated travel time;
  a travel distance between the vehicle position according to the piece of vehicle position information which is received before the navigation apparatus enters the congested section and the start point of the congested section; and
  the weighted first travel distance; and calculating the congested section travel time based on the calculated first travel time, the calculated first travel distance, and a distance of the congested section.

12. The information distribution method of claim 11, further comprising:

calculating, when an additional piece of vehicle position information is received from the navigation apparatus that is within the congested section:
  a travel time from a vehicle position according to a previous piece of vehicle position information which is received when the navigation apparatus is located within the congested section to a vehicle position according to the additional piece of vehicle position information;
  a second travel time by adding the calculated travel time from the vehicle position according to the previous piece of vehicle position information to the vehicle position according to the additional piece of vehicle position information to the first travel time; and
  the congested section travel time based on:
    the second travel time:
    the distance between the start point of the congested section and the vehicle position according to the additional piece of vehicle position information; and
    the distance of the congested section.

13. The information distribution method of claim 12, further comprising:

when a piece of vehicle position information is received from the navigation apparatus after the navigation apparatus has passed through the congested section:
  calculating a travel time from a vehicle position according to a last piece of vehicle position information that is received from the navigation apparatus within the congested section to a vehicle position according to the piece of vehicle position information that is received from the navigation apparatus after the navigation apparatus has passed through the congested section;
  calculating a second travel distance between the vehicle position according to the last piece of vehicle position information and an end point of the congested section
  weighting the second travel distance according to the congestion information about the congested section;
  calculating a third travel time corresponding to the second travel distance based on:
    the calculated travel time from the vehicle position according to the last piece of vehicle position information to the vehicle position according to the piece of vehicle position information that is received from the navigation apparatus after the navigation apparatus has passed through the congested section;
    the weighted second travel distance; and
    a travel distance between the end point of the congested section and the vehicle position according to the piece of vehicle position information that is received from the navigation apparatus after the navigation apparatus has passed through the congested section; and
  calculating the congested section travel time by adding the third travel time to the second travel time.

14. The information distribution method of claim 10, further comprising:

receiving one of the two pieces of vehicle position information from the navigation apparatus before the navigation apparatus enters the congested section;

receiving the other of the two pieces of vehicle position information from the navigation apparatus after the navigation apparatus passes through the congested section;

calculating the first travel distance between a start point of the congested section and an end point of the congested section;

calculating a travel time from a vehicle position according to the piece of vehicle position information which is received between the navigation apparatus enters the congested section to the vehicle position according to the piece of vehicle position information which is received after the navigation apparatus passes through the congested section;

calculating the first travel time as the congested section travel time based on:
  the calculated travel time;
  a travel distance between the vehicle position according to the piece of vehicle position information which is received before the navigation apparatus enters the congested section and the start point of the congested section;
  a travel distance between the end point of the congested section and the vehicle position according to the piece of vehicle position information which is received after the navigation apparatus passes through the congested section; and
  the weighted first travel distance.

15. The information distribution method of claim 10, further comprising:

causing the communication device to distribute the congested section travel time to the navigation apparatus when the information distribution center receives a request to distribute the congested section travel time from the navigation apparatus.

16. The information distribution method of claim 10, further comprising:

distributing the congested section travel time to the navigation apparatus at a predetermined interval different from the predetermined time period.

17. The information distribution method of claim 10, further comprising:

distributing the congested section travel time to the navigation apparatus every time the congested section travel time is calculated.

* * * * *